Feb. 21, 1928.
F. A. BENFORD
MIRROR
Filed Aug. 25, 1924    2 Sheets-Sheet 2
Fig. 3.
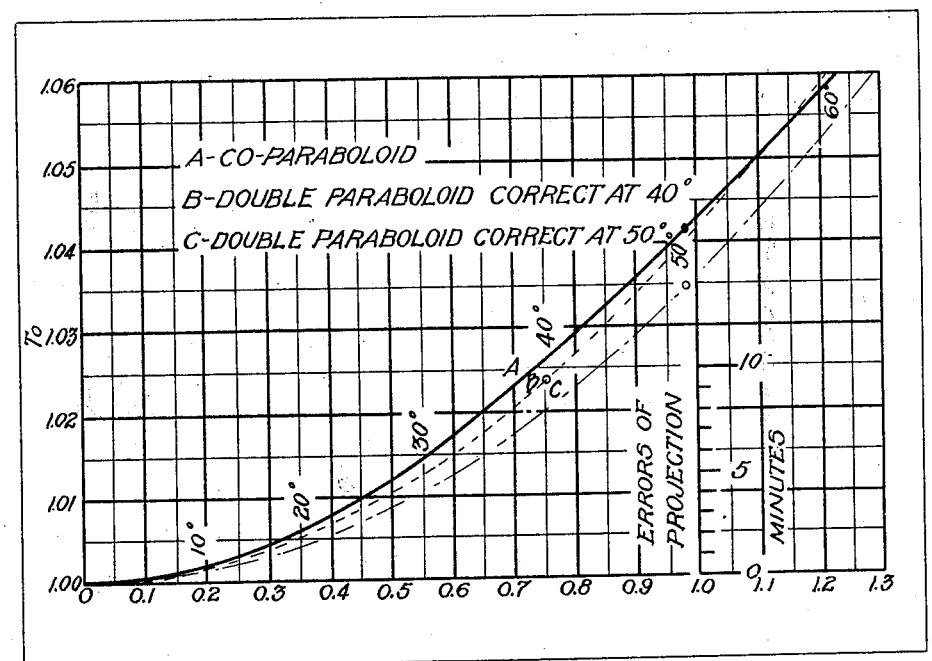
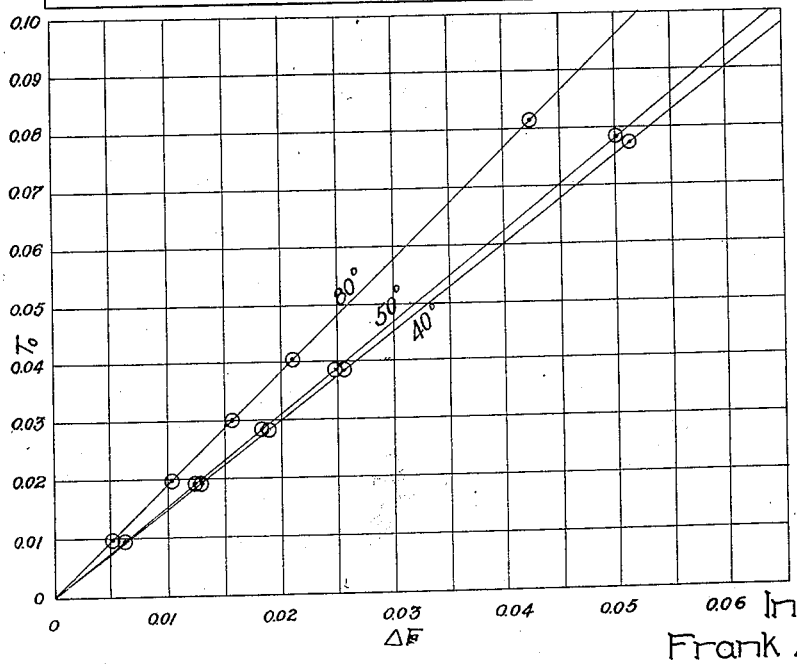
Fig 2.
Inventor:
Frank A. Benford,
by His Attorney.

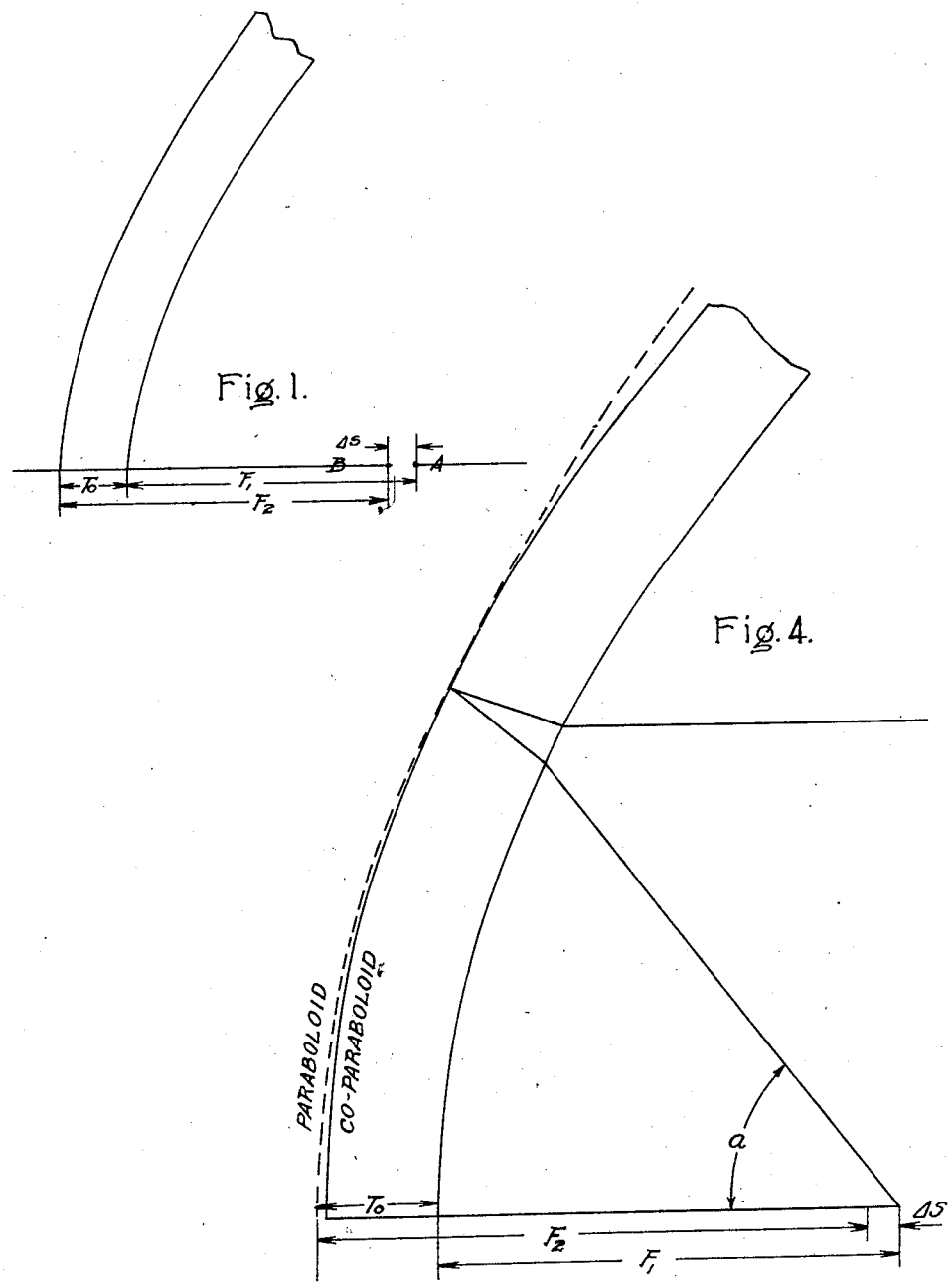

Patented Feb. 21, 1928.

1,659,761

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

MIRROR.

Application filed August 25, 1924. Serial No. 733,897.

My invention relates to reflectors and in particular to glass reflectors of the paraboloidal type adapted for use in searchlights and projectors.

It is well known that reflectors of this type produce not only a beam from the rear metal covered surface but also one from the front surface. Heretofore, efforts have been made to provide paraboloidal reflectors with the rear surface specially constructed in order that the reflected beams from both surfaces may coincide. This would mean, of course, that the beams reflected by both the front and rear surfaces would be substantially parallel with the axis of the reflector.

In my prior Patent No. 1,501,031, there is shown and described a reflector with a front paraboloidal surface and a specially constructed rear surface, which back surface for convenience may be referred to as the co-paraboloidal surface. This co-paraboloidal surface is a correct surface with respect to the front surface so that the beams of the two surfaces coincide.

Special surfaces such as the co-paraboloidal surface of my said prior patent are difficult to prepare and it is an object of my invention to produce a reflector with both front and back surfaces paraboloidal in form but so related that the results obtained approximate for practical purposes the co-paraboloidal form of reflector.

The following comments about the construction of glass surfaces may be helpful in this connection. The parabolic mirror used in a searchlight is an article of some precision, but it is well to distinguish between the mirror of commerce and the real scientific instrument of the astronomer. When a telescope of sixty inches diameter is built it is a matter of international importance; technical journals and the daily press find in the new telescope a prolific source of interesting news, often of a speculative nature. The reason for the great interest displayed is largely the rarity of large telescopes. As a contrast with this rarity the mirror of commerce, and particularly the mirror for military use, must often be turned out at the rate of hundreds per year. In addition to the urgent demand for large quantities of mirrors in a military emergency there is always the question of cost of production. For these reasons the mirrors are produced on a quantity basis, and obviously the work must be done largely by machinery and not by hand. The type of mirror in which we are interested is therefore a machined article and we may profitably inquire into its characteristics and see how it conforms to requirements.

In the manufacture of optical lenses or mirrors there are three surfaces that are in some measure what may be termed self-forming. First in order of natural accuracy is the plain surface. In recent years the grinding of glass and metal gauges and other flat optical surfaces has reached a high state of perfection. Every day new uses are being found for the "optical flats", as the glass disks are called. A wavelength of green light is half of one millionth of a meter in length, but optical flats are made with less variation from perfection than this. In principle the manufacture of optical flats is extremely simple but in practice there is required a high degree of skill. The principle of grinding is this—three fairly flat surfaces $a$, $b$ and $c$ are ground together in all combinations, that is, $a$ against $b$, $a$ against $c$, and $b$ against $c$. When this cycle of operations is repeated a number of times all three surfaces show a natural tendency to become flat, and the degree of flatness is seemingly limited only by the skill and patience of the workman.

The second surface to be considered is the sphere, but while a spherical grinder on a spherical glass surface may give a true spherical form, there will possibly be a variation from the desired radius. Thus the natural accuracy of the spherical surface is one degree less than the natural accuracy of the plain surface.

The third surface to be considered is the paraboloid. Such a surface cut by a meridian plane gives a parabolic section, and further, any parallel cutting plane will give an exactly similar section. Thus a parabolic gauge or grinding strip made to fit a meridian section will fit a paraboloidal surface in any plane parallel to the meridian. This may not be a manufacturing possibility, but it indicates a theoretical method of using a grinding form to produce an approximate paraboloidal surface. If both form and surface are worn by the grinding, then a lateral movement of the form combined with a rotation of the surface will ultimately bring both surfaces into full contact in all positions, which is possible only when they are both parabolic in outline. There are many linkages that will guide a grinding pad in a parabolic curve, and numerous patents have been granted for paraboloid grinding machines. Not all of these are commercially successful, but they indicate a certain degree of ease in attaining a parabola, and hence the paraboloid is one of the three natural surfaces, and it is to be preferred for manufacturing to any aspheric or non-conical surface.

Therefore an object of the invention is to provide a mirror both surfaces of which are paraboloidal because it can be produced with great precision and with much greater facility than the specially constructed curves above mentioned. For convenience I will refer to this mirror as a double paraboloidal mirror.

In the construction of glass mirrors having both surfaces of the paraboloidal form one of the problems is to select the two curves so as to arrive at the best optical results. Let us first set down the obvious conditions to be met and then proceed to satisfy them in what seems to be the best manner. The conditions are 1. A central thickness of glass, $T_o$, sufficient for mechanical strength.

2. A limiting thickness at the edge of the mirror set by the thickness of the available supply of plate glass, and by the allowable weight for the finished mirror.

3. A balancing of the optical errors so that the focal positions of various mirror zones will lie within a short space upon the optical axis.

4. The mirror zones that are most valuable in producing high central beam intensity should be given most weight in balancing the optical errors.

The general rule is to make the central thickness $T_o$ somewhere between two and four per cent of the focal length, the greater thickness being used for the smaller diameter mirrors.

It is well known that the divergence of light from the outer zones of the mirror is less than from the central zones. Also that the area of the outer zones is greater than that of the inner zones. As an example, the central zone from 0 deg. to 10 degrees on a 60 inch mirror contributes 27,600,000 candles with a certain light source and gives a beam of 1 degree 30 minutes width. The 50 degree-60 degree zone contributes 387,000,000 candles to the central beam and has a width of only 52 minutes. It is therefore evident that the outer zone is of vastly greater importance and requires a better optical accuracy than the inner zones, and the point of exact optical accuracy, if only one such point is attainable, should be away from the axis of the mirror.

One of the objects of the invention is to provide a double paraboloidal mirror with the rear surface tangent to the co-paraboloidal surface along a circle about the axis of the reflector which circle lies approximately at the center of the zones most valuable in producing high central beam intensity. Therefore the greater the angular width of the mirror the farther out will be the circle of tangency.

The details of my invention are hereinafter more fully set forth and claimed, reference being had to the accompanying drawings in which Fig. 1 shows diagrammatically a section in elevation of a reflector with the front and rear surfaces both paraboloidal. The drawing also shows the focii and focal distances of the two surfaces. Fig. 2 is a drawing in which the upper curve shows the approximate relation between the central thickness $T_o$ of a mirror having paraboloidal front and rear surfaces and the difference $\triangle F$ between the geometrical focal lengths of these two paraboloids the rear surface being optically correct along a ring about the axis the points in which fall in the line of an 80 degree ray from the focal point of the front surface. Therefore the ring falls within the co-paraboloidal surface of the patent and the rear surface of the figure may be considered as being tagent to the co-paraboloid along that circle. The five points on this curve marked with circles were computed for five different thicknesses of glass, ranging from 1 per cent to 8 per cent of the focal length of the front paraboloid. This curve has in reality a slight curvature and is not a straight line as it appears to be. Similarly the two other curves are for mirrors made optically correct along the 50 degree and 40 degree circles instead of the 80 degree circle. The central thickness $T_o$ of the double paraboloidal mirror as measured between the two paraboloids along the $x$ axis no longer agrees with the $T_o$ of the patent but is always slightly greater than in the co-paraboloidal mirror. Fig. 3 shows the relation between the varying thickness of two double paraboloidal reflectors and one co-paraboloidal reflector from center to circumference and the rectified length of the front surface for each of the three reflectors. The varying thickness of each reflector is given in terms of its own central thickness taken as unity and the rectified lengths are given in terms of the focal length $F_1=1$ of the front surface. In this drawing the curve A gives the varying thickness for the co-paraboloidal reflector of the Patent 1,501,031. The curve B gives the varying thickness for a double paraboloid type of reflector the subject of this invention with the 40 degree circle coinciding with the co-paraboloidal surface of the patent. Curve C is a similar curve with the 50 degree circle coinciding with the co-paraboloid. Fig. 4 shows the relation between the surfaces of the double paraboloid mirror contemplated by this invention and the surface of the co-paraboloidal surface of the patent.

*Focal length and focal point of the second surface.*

The true back surface, or co-paraboloid, has been located by the computation of a number of points (see U. S. Patent No. 1,501,031) and in the computation of these $(x_3 y_3)$ points the angles of both the incident and reflected rays have been obtained. The bisector of these two ray-paths is the normal to the optically correct surface, and if the back surface or co-paraboloid is to be replaced by a back surface paraboloid of correct position and curvature at a given point $(x_3 y_3)$ they must obviously have a common normal through this $(x_3 y_3)$ point.

Referring to Fig. 1 of the Patent No. 1,501,031, $d$ is the angle of the incident ray, and $f$ is the angle of the reflected ray, measuring from the $x$ axis. The angle of the bisector, or normal, is $$\frac{a'}{2} = \frac{d+f}{2} \qquad (1)$$

and we have the relation $$y_3 = 2F_2 \tan \frac{a'}{2} \qquad (2)$$

where $F_2$, the focal length of the back surface desired, differs from $F_1$, the focal length of the front surface, the angle $a'$ here used being different from the angle $a$ previously used for the front surface.

Solving for $F_2$ we find the focal length of the back surface to be $$F_2 = \frac{y_3}{2 \tan \frac{a'}{2}} \qquad (3)$$

The vertex of this paraboloid is shifted to the left of the origin a distance equal to the thickness $T_o$ of the center of the mirror. The equation of the generating parabola is $$y^2_3 = 4F_2(x_3 + T_o) \qquad (4)$$

and we get $$T_o = \frac{y^2_3}{4F_2} - x_3 \qquad (5)$$

for the thickness of glass on the optical axis.

The geometrical focal points of the two paraboloids, considered singly, differ in position by a space $\triangle S$ such that $$\triangle S = F_1 + T_o - F_2 \qquad (6)$$

or $$\triangle S = T_o - \triangle F \qquad (7)$$

Where $\triangle F$ is the difference between $F_2$ and $F_1$ and if we know all the terms in the above equations the double paraboloid is fully defined and is optically correct at the selected point $(x_3 y_3)$ or along a circle about the axis of the reflector as a center passing through this point. The optical errors at other points and their influence will be subsequently described.

*Double-paraboloids adjusted at various angles.*

The standard angular width from the axis is about 60 degrees for the great majority of accurate mirrors, but there is also use for accurate mirrors of greater and less angles. In order to cover the range of useful angles three sets of computations were made, one for 40 degrees, one for 50 degrees, and one for 80 degrees. These points are near the edges of mirrors of 50 degrees, 60 degrees and 90 degrees which are the angles selected as representing the range of requirements in mirror widths.

There are certain standards of thickness of glass in the finished mirror. The average is about 4 per cent of the focal length for small mirrors and 2 per cent for large mirrors. There is occasional use for mirrors of more than 4 per cent thickness, and accordingly the computations have included values of $T_o$ up to 0.08 $F_1$.

Some computed values of $\triangle F$ are listed in the table below along with the central thickness $T_o$.

*Design data for double paraboloidal mirrors.*

Refractive index $n=1.52$.

Focal length $F_1=1$.

| Approx. | Angle | Surfaces* tangent at— | | | Second surface paraboloid | | |
|---|---|---|---|---|---|---|---|
| $T_o$ | $a$ | $x_3$ | $y_3$ | $\frac{d+f}{2}$ | $T_o$ | $\triangle F$ | $\triangle S$ |
| $0.01F_1$ | 40 | 0.1241101 | 0.7333731 | 20° 1′ 10.20″ | 0.0094943 | 0.0063972 | 0.0030971 |
| $0.02F_1$ | | 0.1156713 | 0.7388541 | 20° 2′ 20.46″ | 0.0190741 | 0.0128459 | 0.0062282 |
| $0.03F_1$ | | 0.1072098 | 0.7443498 | 20° 3′ 30.76″ | 0.0286816 | 0.0193005 | 0.0093811 |
| $0.04F_1$ | | 0.0987078 | 0.7498718 | 20° 4′ 41.11″ | 0.0383366 | 0.0257758 | 0.0125608 |
| $0.08F_1$ | | 0.0642906 | 0.7722258 | 20° 9′ 23.03″ | 0.0774378 | 0.0518938 | 0.0255440 |
| $0.01F_1$ | 50 | 0.2096604 | 0.9394145 | 25° 1′ 23.48″ | 0.0095992 | 0.0062271 | 0.0033721 |
| $0.02F_1$ | | 0.2019251 | 0.9461728 | 25° 2′ 46.11″ | 0.0191427 | 0.0124079 | 0.0067348 |
| $0.03F_1$ | | 0.1941472 | 0.9529677 | 25° 4′ 8.80″ | 0.0287409 | 0.0186132 | 0.0101277 |
| $0.04F_1$ | | 0.1862497 | 0.9598681 | 25° 5′ 32.41″ | 0.0384595 | 0.0249061 | 0.0135834 |
| $0.08F_1$ | | 0.1543474 | 0.9877406 | 25°11′ 6.41″ | 0.0780736 | 0.0502360 | 0.0278376 |
| $0.01F_1$ | 80 | 0.6992241 | 1.6886334 | 40° 1′ 39.94″ | 0.0099406 | 0.0052301 | 0.0047105 |
| $0.02F_1$ | | 0.6993258 | 1.6991508 | 40° 3′ 20.04″ | 0.0199601 | 0.0104884 | 0.0094717 |
| $0.03F_1$ | | 0.6893933 | 1.7097363 | 40° 4′ 58.29″ | 0.0300357 | 0.0158054 | 0.0142303 |
| $0.04F_1$ | | 0.6844393 | 1.7203687 | 40° 6′ 40.44″ | 0.0401974 | 0.0210953 | 0.0191021 |
| $0.08F_1$ | | 0.6641941 | 1.7638185 | 40°13′ 24.04″ | 0.0816945 | 0.0427363 | 0.0389582 |

*The surfaces that are tangent are the optically correct co-paraboloid and the paraboloidal approximation, which is correct optically at the angle $a$.

It should be observed that in case $T_o$ was required to be some particular value, say exactly 3 per cent, it would be necessary to solve equation (1) to (7) a number of times and arrive at the desired value of $T_o$ by a series of approximations. But it is seldom necessary to specify the central thickness closer than one part in a hundred, so that this preliminary solution for $T_o$ is not a matter of any difficulty.

The selection of 40, 50 and 80 degrees for the correction points was made for present requirements, but we may expect that in the future other points will be selected. To obviate the necessity of computing additional points the data on $T_o$ and $\triangle F$ were used to get an empirical expression for the relation between these factors. Three types of equations were tried, and the following was found to be best for the entire body of data given in the last columns of the table.

It was noted that at any given angle, say 40 degrees, the following simple relation is fairly accurate:

$$T_o = K \triangle F$$

The factor $K$ has values as follows:

$a = 40$ deg., $K = 1.4860$
$a = 50$ deg., $K = 1.5454$
$a = 80$ deg., $K = 1.9042$ No simple relation between the angle $a$ and $K$ was found, and the following more complex expressions were adopted as being more accurate and of wider application.

$$\triangle F = \frac{T_o}{(0.125 + 0.00035a)T_o + 1.4292 + 0.0545\left(\frac{a}{40}\right)^{3.1}} \quad (8)$$

and $$T_o = \frac{\left[1.4292 + 0.0545\left(\frac{a}{40}\right)^{3.1}\right]\triangle F}{1 - (0.125 + 0.00035a)\triangle F} \quad (9)$$

The above equations have been used to compute values of $\triangle F$ from assumed values of $T_o$ and the agreement of the results with the original direct computation is within one part in a thousand in every case. Practically the same accuracy, which is more than sufficient for specifications and manufacturing purposes, will obtain over the following range—

Angle $a$, 0 deg. to 110 deg.
Thickness $T_o$, 0 to $0.10F$.
Refractive index 1.515 to 1.525.

An error of one part in a thousand gives the following linear values in a standard 60 inch mirror.

Error in $\triangle F =$
$0.001 \times 0.01241 \times 25 = 0.00031$ inch

Error in $\triangle S =$
$0.001 \times 0.00673 \times 25 = 0.00017$ inch

These errors are less than the normal variations in a mirror made by the quantity production method, and the use of the equations will therefore introduce no new errors, although the equations themselves are empirical in nature and not capable of unlimited extension to all angles, indices and thicknesses.

Thickness of the double paraboloid.

In Fig. 3 the three curves show: A, the thickness of the correct mirror; B, the thickness of a double paraboloid corrected at 40 degrees; and C, the thickness of a double paraboloid corrected at 50 degrees. The accuracy of the latter mirrors is measured not by the closeness of their curves to curve A but by their approach to parallelism with the curve A at any given angle $a$, and at the points where the curves B and C are parallel to the co-paraboloidal curve there will be no errors of projection in the double paraboloidal construction. The curves are parallel at the centers and at the selected point of correction, but at all other points there is either a deflection across the axis of the beam or a divergence away from the axis. The final effect of both are identical for at working ranges the radial distance of the point of reflection is extremely small in comparison with the distance of projection.

From the center of the double paraboloid to the point of parallelism with the co-paraboloid the mirror runs thin, and the ray which should be parallel to the axis is deflected across the axis. Beyond the point of correction the glass runs thick and the deflection is outward. Therefore the optical error is measured not by the variation from the correct thickness, but by the variation from parallelism with the co-paraboloidal surface, and later this effect will be measured.

It will be understood that in this specification I am referring for convenience to the rear surface of the form of reflector shown and described in U. S. Letters Patent No. 1,501,031 issued to me as the co-paraboloidal surface. In arriving at the proper companion paraboloidal surface to be used for the rear surface of the reflector, the subject of this invention, I first determine the position of the point $x_3 y_3$ in the co-paraboloidal surface from which an incident ray passing through or originating at the focal point of the front surface is reflected. Assuming first that the angle $a$ of the incident ray with respect to the axis of the reflector is 40°, four different values for $x_3 y_3$ were obtained, each set of values corresponding to a different thickness $T_o$ of reflector along the axis of the reflector which thicknesses were obtained by varying the angular difference between angles $a$ and $b$, see Fig. 2 of the patent. These four values are the first four values tabulated in the sixth column of the accompanying table. In this table the four different values for $x_3 y_3$ corresponding to four different thicknesses while using a 40° angle are also given in the corresponding columns under $x_3 y_3$, namely the fourth and fifth columns. From the foregoing data I was able to obtain the values of $\triangle F$ and $\triangle S$ given in the last two columns of the table. It will be seen that the relation between the values of $T_o$, $\triangle S$ and $\triangle F$ for the particular angle of 40° is substantially constant, $\triangle F$ being about twice as large as $\triangle S$ in every case, and $T_o$ being about three times $\triangle S$.

The same process was gone through, assuming the incident ray to be 50°. The same thing was repeated, assuming the incident ray to be 80°. While the relation between the values for $T_o$, $\triangle F$ and $\triangle S$ corresponding to the angle of 80° are substantially constant, the relation corresponding to 40°, 50° and 80° substantially differs. In other words the relations between $T_o$, $\triangle F$ and $S\triangle$ values vary with the angle. Having obtained the relation between these values corresponding to the angles of 40°, 50° and 80° I then determined the equations 8 and 9 herein which enabled me to compute $\triangle F$ and hence $F_2$ for the corresponding paraboloidal surface for the rear surface of the reflector for varying thickness $T_o$ of glass along the $x$ axis and for varying angles $a$.

By substituting any desired values for $T_o$ and any desired angle for the angle $a$ the value of $\triangle F$ may be obtained in terms of $F_1$, the focal distance of the front paraboloidal surface, and this, of course, determines the rear paraboloidal surface.

It will be understood that in the table of design data for double paraboloidal mirrors appearing in the foregoing that the values of $x$ and $y$ are given in terms of the value of the focal distance of $F_1$ of the front paraboloidal surface, which is given a value of unity. The angles in the column $$\frac{d+f}{2}$$

represent the slope of the normal to the rear surface at the point $x_3 y_3$. It will also be understood that the values under the column $T_o$, $\triangle F$ and $\triangle S$ are also given in terms of $F_1$.

In Fig. 3 near the lower right-hand corner there is shown a stub scale of "errors of projection". This scale is useful in determining what angular error of projection is caused by the lack of parallelism between curves A and B, or A and C at any particular ordinate. Also this scale is for a particular thickness of mirror where $T_o = 0.0382369F_1$, and if other thicknesses are used the error of projection will be in direct proportion to the thickness.

The two mirrors whose thickness curves are given in Fig. 3 will in no case have projection errors of more than 0 degree 5 minutes for a central thickness of $0.0382369F_1$. Some of the larger commercial mirrors of high accuracy have a central thickness of about $0.0225F_1$, and using the specification herein laid down the maximum error of projection will be about 0 degree 3 minutes which should fulfill the most exacting requirements for the projection of light.

While in the disclosure of my invention I have referred to concrete and specific illustrations, it will be understood that the principles of my invention may be applied to other modifications without departing from the spirit of the invention or from the scope of the claims herein.

What I claim as new and desire to secure by Letters Patent of the United States, is:—

1. A double paraboloidal glass reflector in which the front surface of the glass is in the form of a paraboloidal surface of revolution and in which the rear surface of the glass is also in the form of a paraboloidal surface of revolution, said surfaces being so related that the focal length of the rear surface has a definite relation to the focal length of the front surface, said relation varying with the angle $a$ of an incident ray from the focal point of the front surface, which ray is reflected by the rear surface and projected by the reflector parallel to the axis of the reflector.

2. A double paraboloidal glass reflector in which the front surface of the glass is in the form of a paraboloidal surface of revolution and in which the rear surface of the glass is also in the form of a paraboloidal surface of revolution, said surfaces being so related that the focal length of the rear surface has a definite relation to the focal length of the front surface, said relation varying only with thickness $T_o$ of the glass and with the angle $a$ of an incident ray from the focal point of the front surface, which ray is reflected by the rear surface and projected by the reflector parallel to the axis of the reflector.

3. A double paraboloidal glass reflector in which the front surface of the glass is in the form of a paraboloidal surface of revolution and in which the rear surface of the glass is also in the form of a paraboloidal surface of revolution, said surfaces being so related that the focal length of the rear surface has a definite relation to the focal length of the front surface, said relation being expressed by the following equation:

$$\Delta F = \frac{T_o}{(0.125 + 0.00035a(T_o + 1.4292 + 0.0545\left(\frac{a}{40}\right)} 3.1$$

4. A double paraboloidal glass reflector in which the front surface of the glass is in the form of a paraboloidal surface of revolution and in which the rear surface of the glass is also in the form of a paraboloidal surface of revolution, the rear surface being constructed tangent to a theoretical co-paraboloidal surface corresponding to the inner surface in a common circumference.

5. A double paraboloidal glass reflector in which the front surface of the glass is in the form of a paraboloidal surface of revolution and in which the rear surface of the glass is also in the form of a paraboloidal surface of revolution, the rear surface being constructed tangent to a theoretical co-paraboloidal surface corresponding to the inner surface in a common circumference, the thickness of the double paraboloidal reflector as compared with the co-paraboloidal reflector being a minimum along a perpendicular to the rear paraboloidal surface at a point in said circumference.

In witness whereof, I have hereunto set my hand this 22d day of August, 1924.

FRANK A. BENFORD.

CERTIFICATE OF CORRECTION.

Patent No. 1,659,761.  Granted February 21, 1928, to

FRANK A. BENFORD.

It is hereby certified that error appears in the printed specification of the above numbered patent requiring correction as follows: Page 5, line 84, the "triangle" after the "S" should be transposed before the "S"; and that the said Letters Patent should be read with this correction therein that the same may conform to the record of the case in the Patent Office.

Signed and sealed this 20th day of March, A. D. 1928.

Seal.

M. J. Moore,
Acting Commissioner of Patents.